US010869309B2

(12) United States Patent
Xiong

(10) Patent No.: US 10,869,309 B2
(45) Date of Patent: Dec. 15, 2020

(54) RANDOM ACCESS IN AN ULTRA-LARGE COVERAGE CELL USING A SINGLE-BIT TIMING ADVANCE IDENTIFIER

(71) Applicant: Huawei Technologies Co., Ltd., Guangdong (CN)

(72) Inventor: Xin Xiong, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 232 days.

(21) Appl. No.: 15/394,382

(22) Filed: Dec. 29, 2016

(65) Prior Publication Data

US 2017/0111908 A1    Apr. 20, 2017

Related U.S. Application Data

(63) Continuation of application No. PCT/CN2014/081325, filed on Jul. 1, 2014.

(51) Int. Cl.
*H04W 72/04* (2009.01)
*H04W 48/10* (2009.01)
(Continued)

(52) U.S. Cl.
CPC ....... *H04W 72/0446* (2013.01); *H04W 48/10* (2013.01); *H04W 56/0045* (2013.01);
(Continued)

(58) Field of Classification Search
CPC ............. H04W 72/0446; H04W 48/10; H04W 56/0045; H04W 72/048; H04W 72/085; H04W 74/08; H04W 74/0833
See application file for complete search history.

(56) References Cited

U.S. PATENT DOCUMENTS

2004/0104841 A1* 6/2004 Syrjarinne ............ H04W 60/00
                                                    342/357.25
2011/0103499 A1* 5/2011 Cheng ............... H04W 56/0045
                                                    375/260
(Continued)

FOREIGN PATENT DOCUMENTS

CN        101369840 A    2/2009
CN        101478780 A    7/2009
(Continued)

OTHER PUBLICATIONS

3GPP TS 36.213 V10.4.0 (Dec. 2011) Technical Specification 3rd Generation Partnership Project; Technical Specification Group Radio Access Network; Evolved Universal Terrestrial Radio Access (E-UTRA); Physical layer procedures (Release 10) (Year: 2011).*

*Primary Examiner* — Chi H Pham
*Assistant Examiner* — Weibin Huang
(74) *Attorney, Agent, or Firm* — Womble Bond Dickinson (US) LLP

(57) ABSTRACT

Embodiments of the present invention disclose a random access method. In a scenario of an ultra-large coverage cell, the method includes: receiving a random access (RA) preamble sent by user equipment (UE); setting a timing advance $T_A$ and an R-bit identifier that are of the ultra-large coverage cell, where the R-bit identifier is used to indicate a time granularity of the timing advance $T_A$ or is used to indicate a value range of the timing advance $T_A$; and sending a random access (RA) response message to the UE, where the RA response message includes the timing advance $T_A$ and the R-bit identifier, and the ultra-large coverage cell is a cell with a coverage distance greater than 107 Km. Therefore, uplink time and downlink time are aligned when uplink signals sent by UEs in different positions in a cell arrive at a base station.

9 Claims, 7 Drawing Sheets

(51) Int. Cl.
*H04W 56/00* (2009.01)
*H04W 72/08* (2009.01)
*H04W 74/08* (2009.01)

(52) U.S. Cl.
CPC ....... *H04W 72/048* (2013.01); *H04W 72/085* (2013.01); *H04W 74/0833* (2013.01)

(56) References Cited

U.S. PATENT DOCUMENTS

| | | | | |
|---|---|---|---|---|
| 2013/0215861 A1* | 8/2013 | Nam | ................ | H04W 56/0005 370/329 |
| 2013/0235855 A1* | 9/2013 | Diachina | ............... | H04W 72/14 370/336 |
| 2015/0208386 A1* | 7/2015 | Yang | .................... | H04L 1/1861 370/329 |
| 2015/0341918 A1* | 11/2015 | Yang | .................. | H04W 68/005 370/312 |
| 2016/0234864 A1* | 8/2016 | Guo | ................. | H04W 72/0446 |
| 2016/0337839 A1* | 11/2016 | Chae | ................. | H04W 72/1263 |

FOREIGN PATENT DOCUMENTS

| | | | |
|---|---|---|---|
| CN | 102511189 | A | 6/2012 |
| CN | 102647783 | A | 8/2012 |
| CN | 103857030 | A | 6/2014 |
| EP | 2621226 | A1 | 7/2013 |
| WO | 2014086214 | A1 | 6/2014 |

\* cited by examiner

RANDOM ACCESS IN AN ULTRA-LARGE COVERAGE CELL USING A SINGLE-BIT TIMING ADVANCE IDENTIFIER

CROSS-REFERENCE TO RELATED APPLICATIONS

This application is a continuation of International Application No. PCT/CN2014/081325, filed on Jul. 1, 2014, the disclosure of which is hereby incorporated by reference in its entirety.

TECHNICAL FIELD

Embodiments of the present invention relate to the communications field, and in particular, to a random access method and apparatus.

BACKGROUND

When user equipment (UE) in Long Term Evolution (LTE) communicates with a base station, the UE needs to be synchronous with the base station in uplink time and downlink time, to ensure normal communication between the UE and the base station.

Each UE is in a different position in a cell, and each UE has a different distance to the base station. Therefore, a different transmission delay is generated when each UE sends an uplink signal or data to the base station. As a result, the UE cannot be synchronous with the base station in uplink time and downlink time. To resolve this problem, a timing advance $T_A$ is introduced, so that uplink time and downlink time are aligned when uplink signals or data sent by UEs in different positions in a cell arrive or arrives at a base station. This ensures quality of communication between the UE and the base station.

However, a currently adjustable timing advance $T_A$ supports only a maximum coverage cell distance of 107 kilometers. With development of rapid transit, for example, people want to maintain good communication quality on a high speed train and an airplane. However, in a scenario of an ultra-large coverage cell (greater than 107 Km), uplink time and downlink time are not synchronous when uplink signals or data sent by UEs in different positions in a cell arrive or arrives at a base station. As a result, quality of communication between the UE and the base station cannot be ensured.

SUMMARY

In view of this, embodiments of the present invention provide a cell random access method and apparatus, which may resolve a problem that how to ensure quality of communication between UE and a base station in a scenario of an ultra-large coverage distance.

According to a first aspect of embodiments of the present invention, a random access apparatus is provided, where the apparatus is applied to an ultra-large coverage scenario, and the apparatus includes:

a receiving unit, configured to receive a random access preamble RA preamble sent by user equipment UE;

a processing unit, configured to set a timing advance $T_A$ and an R-bit identifier that are of the ultra-large coverage cell after the receiving unit receives the RA preamble, where the R-bit identifier is used to indicate a time granularity of the timing advance $T_A$ or is used to indicate a value range of the timing advance $T_A$; and a sending unit, configured to send a random access response RA response message to the UE, where the RA response message includes the timing advance $T_A$ and the R-bit identifier that are set by the processing unit; and the ultra-large coverage cell is a cell with a coverage distance greater than 107 Km.

Optionally, the processing unit is specifically configured to set the R-bit identifier to 1 in the random access response message, indicating that the time granularity of the timing advance $T_A$ is greater than 16 $T_S$; or set the R-bit identifier to 0 in the random access response message, indicating that the time granularity of the timing advance $T_A$ is 16 $T_S$.

Optionally, the processing unit is specifically configured to set the R-bit identifier to 1 in the random access response message, indicating the value range of the timing advance $T_A$, where the value range is 0, 1, 2, . . . , a value greater than 1282; or set the R-bit identifier to 0 in the random access response message, indicating the value range of the timing advance $T_A$, where the value range is 0, 1, 2, . . . , 1282.

According to another aspect of embodiments of the present invention, another random access apparatus is provided, where the apparatus is applied to a scenario of an ultra-large coverage cell and includes:

a sending unit, configured to send a random access preamble RA preamble to a base station;

a receiving unit, configured to receive a random access response RA response message sent by the base station, where the RA response message includes a timing advance $T_A$ and an R-bit identifier, and the R-bit identifier is used to indicate a time granularity of the timing advance $T_A$ or is used to indicate a value range of the timing advance $T_A$; and a processing unit, configured to adjust uplink transmission timing according to the timing advance $T_A$ received by the receiving unit and the time granularity of the timing advance $T_A$ or the value range of the timing advance $T_A$ indicated by the R-bit identifier; where the sending unit is configured to send an uplink signal or data according to the uplink transmission timing adjusted by the processing unit; and the ultra-large coverage cell is a cell with a coverage distance greater than 107 Km.

Optionally, when the R-bit identifier received by the receiving unit is 1, it indicates that the time granularity of the timing advance $T_A$ is greater than 16 $T_S$; or when the R-bit identifier received by the receiving unit is 0, it indicates that the time granularity of the timing advance $T_A$ is 16 $T_S$.

Optionally, when the R-bit identifier received by the receiving unit is 1, the value range of the timing advance $T_A$ is indicated, where the value range is 0, 1, 2, a value greater than 1282; or when the R-bit identifier received by the receiving unit is 0, the value range of the timing advance $T_A$ is indicated, where the value range is 0, 1, 2, . . . , 1282.

According to another aspect of embodiments of the present invention, a random access method is provided, where the method is applied to a scenario of an ultra-large coverage cell and includes:

receiving a random access preamble RA preamble sent by user equipment UE; setting a timing advance $T_A$ and an R-bit identifier that are of the ultra-large coverage cell, where the R-bit identifier is used to indicate a time granularity of the timing advance $T_A$ or is used to indicate a value range of the timing advance $T_A$; and sending a random access response RA response message to the UE, where the RA response message includes the timing advance $T_A$ and the R-bit identifier; and the ultra-large coverage cell is a cell with a coverage distance greater than 107 Km.

Optionally, the setting an R-bit identifier of the ultra-large coverage cell includes: setting the R-bit identifier to 1 in the random access response message, indicating that the time granularity of the timing advance $T_A$ is greater than 16 $T_S$; or setting the R-bit identifier to 0 in the random access response message, indicating that the time granularity of the timing advance $T_A$ is 16 $T_S$.

Optionally, the setting an R-bit identifier of the ultra-large coverage cell includes: when the R-bit identifier is set to 1 in the random access response message, indicating the value range of the timing advance $T_A$, where the value range is 0, 1, 2, ..., a value greater than 1282; or when the R-bit identifier is set to 0 in the random access response message, indicating the value range of the timing advance $T_A$, where the value range is 0, 1, 2, ..., 1282.

According to another aspect of embodiments of the present invention, another random access method is provided, where the method is applied to a scenario of an ultra-large coverage cell and includes:

sending a random access preamble RA preamble to a base station;

receiving a random access response RA response message, where the RA response message includes a timing advance $T_A$ and an R-bit identifier, and the R-bit identifier is used to indicate a time granularity of the timing advance $T_A$ or is used to indicate a value range of the timing advance $T_A$;

adjusting uplink transmission timing according to the timing advance $T_A$ and the time granularity of the timing advance $T_A$ or the value range of the timing advance $T_A$ indicated by the R-bit identifier; and sending an uplink signal or data according to the adjusted uplink transmission timing; where the ultra-large coverage cell is a cell with a coverage distance greater than 107 Km.

Optionally, when the received R-bit identifier is 1, it indicates that the time granularity of the timing advance $T_A$ is greater than 16 $T_S$; or when the received R-bit identifier is 0, it indicates that the time granularity of the timing advance $T_A$ is 16 $T_S$.

Optionally, when the received R-bit identifier is 1, the value range of the timing advance $T_A$ is indicated, where the value range is 0, 1, 2, ..., a value greater than 1282; or when the received R-bit identifier is 0, the value range of the timing advance $T_A$ is indicated, where the value range is 0, 1, 2, ..., 1282.

According to another aspect of embodiments of the present invention, another random access apparatus is provided, where the apparatus is applied to a scenario of an ultra-large coverage cell and includes:

a processing unit, configured to obtain a random access offset range for sending a random access preamble RA preamble; where the processing unit is configured to determine, according to radio environment measurement information REM, that a position of the UE in a current cell exceeds a coverage distance supported by a guard period GP of the preamble and is less than a coverage distance corresponding to c×(GP+Random access offset range)/2, where c is a speed of light and GP is a guard period in a random access preamble format 3; and a sending unit, configured to send the preamble.

Optionally, the random access offset range obtained by the processing unit includes offsetting by N subframes or M offset symbols, where M is a positive integer greater than or equal to 1 and N is a positive integer greater than or equal to 1.

Optionally, the processing unit is specifically configured to receive a broadcasted system message, where the broadcasted system message carries the random access offset range for sending the random access preamble RA preamble.

Optionally, the processing unit is specifically configured to obtain the random access offset range according to a cell coverage distance and by using the following formula:

Cell coverage distance=$c \times (GP$+Random access offset range$)/2$; where the cell coverage distance is a cell that is preset to be greater than 107 Km, c is $3 \times 10^8$, and GP is a guard period in the random access preamble format 3.

According to another aspect of embodiments of the present invention, another random access apparatus is provided, where the apparatus is applied to a scenario of an ultra-large coverage cell and includes:

a processing unit, configured to obtain, according to a current cell coverage distance, a random access offset range for receiving a random access preamble RA preamble; and a receiving unit, configured to receive the preamble within a first time range, where the first time range includes a sum of a message length of the preamble and the random access offset range obtained by the processing unit.

Optionally, the random access offset range obtained by the processing unit according to the current cell coverage distance includes offsetting by N subframes or M offset symbols, where M is a positive integer greater than or equal to 1 and N is a positive integer greater than or equal to 1.

Optionally, the receiving unit is specifically configured to:

obtain, according to the current cell coverage distance and by using the following formula, the random access offset range for receiving the random access preamble RA preamble, where the formula is specifically:

Cell coverage distance=$c \times (GP$+Random access offset range$)/2$; where the cell coverage distance is a cell that is preset to be greater than 107 Km, c is $3 \times 10^8$, and GP is a guard period in a random access preamble format 3.

Optionally, the random access apparatus further includes a sending unit, configured to add the random access offset range to a broadcasted system message.

According to another aspect of embodiments of the present invention, a random access method is provided, where the method is applied to a scenario of an ultra-large coverage cell and includes:

obtaining, by user equipment UE, a random access offset range for sending a random access preamble RA preamble; where the UE determines, according to radio environment measurement information REM, that a position of the UE in a current cell exceeds a coverage distance supported by a guard period GP of the preamble and is less than a coverage distance corresponding to c×(GP+Random access offset range)/2, where c is a speed of light and GP is a guard period in a random access preamble format 3; and sending, by the UE, the preamble.

Optionally, the random access offset range includes offsetting by N subframes or M offset symbols, where M is a positive integer greater than or equal to 1 and N is a positive integer greater than or equal to 1.

Optionally, the obtaining a random access offset range for sending a random access preamble RA preamble includes: receiving a broadcasted system message, where the broadcasted system message carries the random access offset range for sending the random access preamble RA preamble.

Optionally, the obtaining a random access offset range for sending a random access preamble RA preamble includes: obtaining the random access offset range according to a cell coverage distance and by using the following formula:

Cell coverage distance=$c \times (GP$+Random access offset range$)/2$; where the cell coverage distance is a cell that is preset to be greater than 107 Km, c is $3\times10^8$, and GP is a guard period in a random access preamble format 3.

According to another aspect of embodiments of the present invention, a random access method is provided, where the method is applied to a scenario of an ultra-large coverage cell and includes:

obtaining, by a base station according to a current cell coverage distance, a random access offset range for receiving a random access preamble RA preamble; and receiving, by the base station, the preamble within a first time range, where the first time range includes a sum of a message length of the preamble and the random access offset range.

Optionally, the random access offset range includes offsetting by N subframes or M offset symbols, where M is a positive integer greater than or equal to 1 and N is a positive integer greater than or equal to 1.

Optionally, the random access offset range for receiving the random access preamble RA preamble is obtained according to the current cell coverage distance and by using the following formula, including:

Cell coverage distance=$c\times(GP$+Random access offset range$)/2$; where the cell coverage distance is a cell that is preset to be greater than 107 Km, c is $3\times10^8$, and GP is a guard period in a random access preamble format 3.

Optionally, the method further includes: adding, by the base station, the random access offset range to a broadcasted system message.

By using the foregoing solution, for a scenario of an ultra-large coverage cell, a timing advance $T_A$ and an R-bit identifier that are of the ultra-large coverage cell are set, and the R-bit identifier is used to indicate a time granularity of the timing advance $T_A$ or is used to indicate a value range of the timing advance $T_A$, so that UE may adjust uplink transmission timing according to the timing advance $T_A$ and content indicated by the R-bit identifier, and send an uplink signal and data according to the adjusted uplink transmission timing. Therefore, uplink time and downlink time are synchronous when uplink signals sent by UEs in different positions in a cell arrive at a base station, thereby ensuring quality of communication between the UE and the base station.

For a scenario of an ultra-large coverage cell in the embodiments of the present invention, a base station calculates, according to a cell coverage distance, an offset range for sending a preamble, and receives the preamble within a first time range, where the first time range includes a sum of a message length of the preamble and the random access offset range obtained by the processing unit, so that UE controls a sending time for sending the preamble within a range that can be received by the base station, thereby ensuring a success rate of random access in the scenario of the ultra-large coverage cell, and further improving system stability.

BRIEF DESCRIPTION OF THE DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

The base station mentioned in the present invention may be a NodeB in a Long Term Evolution (Long Term Evolution, LTE) system, may be a base station in a Universal Mobile Telecommunications System (Universal Mobile Telecommunications System, UMTS) system, or may be a base station in another system, which is not limited in the present invention.

A base station adds a timing advance $T_A$ to a random access response (random access response) message that is sent to UE. The UE adjusts uplink transmission timing $N_{TA}=T_A\times16\times T_S$ relatively to downlink transmission timing according to the received timing advance $T_A$. A time granularity $T_S$ is a basic time unit of LTE. That is, a range of the timing advance adjusted by the UE is $T_A$ (0, 1, 2, ..., 1282), each time granularity is 16 $T_S$ symbols, and each $T_S$ symbol is 1/(2048×15000) second. Therefore, a cell coverage distance that can be adjusted by the UE is a cell coverage distance corresponding to a range of 0 to 1282×16×$T_S$, that is, a currently adjustable maximum cell coverage distance is $3×10^8×(1282×16×T_S)/2$, which is approximately equal to 100 kilometers. Correspondingly, the base station may set a timing advance within a range of 0 to a maximum value 0.67 ms (1282×16×$T_S$) of a corresponding cell coverage distance 100 Km at an interval of 0.52 μs (that is, 16×$T_S$).

However, in a scenario of an ultra-large coverage distance, uplink time and downlink time are not synchronous when uplink signals or data sent by UEs in different positions in a cell arrive or arrives at a base station. As a result, quality of communication between the UE and the base station cannot be ensured.

To resolve this technical problem, the present invention provides the following technical solutions.

It should be specially noted that, a distance of the ultra-large coverage cell that is set in this embodiment is intended only to understand examples in the solutions of the present invention, which is included but not limited in the present invention.

Figure 2:
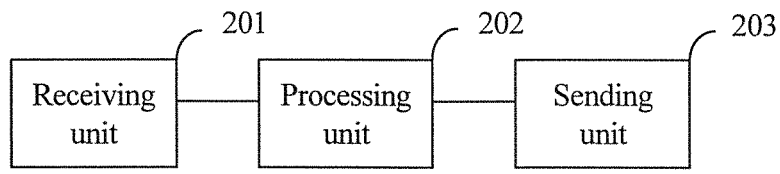
FIG. 2 is a schematic structural diagram of an embodiment of a random access apparatus according to the present invention.

FIG. 2 is a schematic structural diagram of an embodiment of a random access apparatus according to the present invention. The apparatus may execute methods in embodiments shown in FIG. 4 and FIG. 6, and the apparatus may be a base station. As shown in FIG. 2, in a scenario of an ultra-large coverage cell, the apparatus in this embodiment may include:

a receiving unit 201, configured to receive a random access preamble RA preamble sent by user equipment UE;

a processing unit 202, configured to set a timing advance $T_A$ and an R-bit identifier that are of the ultra-large coverage cell, where the R-bit identifier is used to indicate a time granularity of the timing advance $T_A$ or is used to indicate a value range of the timing advance $T_A$; and a sending unit 203, configured to send a random access response RA response message to the UE, where the RA response message includes the timing advance $T_A$ and the R-bit identifier that are set by the processing unit; where the ultra-large coverage cell is a cell with a coverage distance greater than 107 Km.

Further, the processing unit 202 is specifically configured to set the R-bit identifier to 1 in the random access response message, indicating that the time granularity of the timing advance $T_A$ is greater than 16 $T_S$; or set the R-bit identifier to 0 in the random access response message, indicating that the time granularity of the timing advance $T_A$ is 16 $T_S$.

Further, the processing unit 202 is specifically configured to set the R-bit identifier to 1 in the random access response message, indicating the value range of the timing advance $T_A$, where the value range is 0, 1, 2, ..., a value greater than 1282; or set the R-bit identifier to 0 in the random access response message, indicating the value range of the timing advance $T_A$, where the value range is 0, 1, 2, ..., 1282.

By using the foregoing solution, for a scenario of an ultra-large coverage cell, a timing advance $T_A$ and an R-bit identifier that are of the ultra-large coverage cell are set, and the R-bit identifier is used to indicate a time granularity of the timing advance $T_A$ or is used to indicate a value range of the timing advance $T_A$, so that UE may adjust uplink transmission timing according to the timing advance $T_A$ and content indicated by the R-bit identifier, and send an uplink signal and data according to the adjusted uplink transmission timing. Therefore, uplink time and downlink time are synchronous when uplink signals sent by UEs in different positions in a cell arrive at a base station, thereby ensuring quality of communication between the UE and the base station.

It should be specially noted that, in the embodiment shown in FIG. 2, a hardware device corresponding to the receiving unit may be a receiver, a hardware device corresponding to the processing unit may be a processor, and a hardware device corresponding to the sending unit may be a transmitter.

Figure 3:
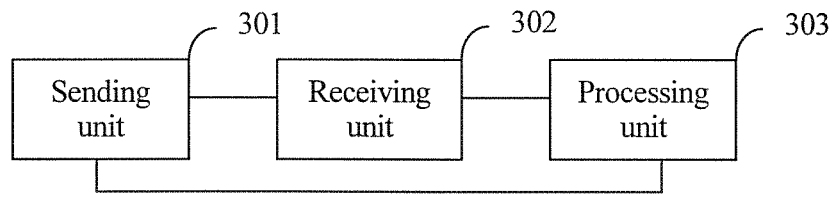
FIG. 3 is a schematic structural diagram of another embodiment of a random access apparatus according to the present invention.

FIG. 3 is a schematic structural diagram of another embodiment of a random access apparatus according to the present invention. The apparatus may be configured to execute methods in embodiments shown in FIG. 5 and FIG. 8, and the apparatus may be UE. As shown in FIG. 3, in a scenario of an ultra-large coverage cell, the apparatus in this embodiment may include:

a sending unit 301, configured to send a random access preamble RA preamble to a base station;

a receiving unit 302, configured to receive a random access response RA response message sent by the base station, where the RA response message includes a timing advance $T_A$ and an R-bit identifier, and the R-bit identifier is used to indicate a time granularity of the timing advance $T_A$ or is used to indicate a value range of the timing advance $T_A$; and a processing unit 303, configured to adjust uplink transmission timing according to the timing advance $T_A$ received by the receiving unit 202 and the time granularity of the timing advance $T_A$ or the value range of the timing advance $T_A$ indicated by the R-bit identifier; where the sending unit 301 is configured to send an uplink signal or data according to the uplink transmission timing adjusted by the processing unit 303; and the ultra-large coverage cell is a cell with a coverage distance greater than 107 Km.

Further, when the R-bit identifier received by the receiving unit 302 is 1, it indicates that the time granularity of the timing advance $T_A$ is greater than 16 $T_S$; or when the R-bit identifier received by the receiving unit 302 is 0, it indicates that the time granularity of the timing advance $T_A$ is 16 $T_S$.

Further, the receiving unit is specifically configured to:

when the R-bit identifier received by the receiving unit 302 is 1, indicate the value range of the timing advance $T_A$, where the value range is 0, 2, ..., a value greater than 1282; or when the R-bit identifier received by the receiving unit 302 is 0, indicate the value range of the timing advance $T_A$, where the value range is 0, 2, ..., 1282.

By using the foregoing solution, for a scenario of an ultra-large coverage cell, a timing advance $T_A$ and an R-bit identifier that are of the ultra-large coverage cell are received, uplink transmission timing is adjusted according to a value of the timing advance $T_A$ and a time granularity of the timing advance $T_A$ or a value range of the timing advance $T_A$ indicated by the R-bit identifier, and an uplink signal or data is sent according to the adjusted uplink transmission timing. Therefore, uplink time and downlink time are synchronous when uplink signals sent by UEs in different positions in a cell arrive at a base station, thereby ensuring quality of communication between the UE and the base station.

It should be specially noted that, in the embodiment shown in FIG. 3, a hardware device corresponding to the receiving unit may be a receiver, a hardware device corresponding to the processing unit may be a processor, and a hardware device corresponding to the sending unit may be a transmitter.

Figure 4:
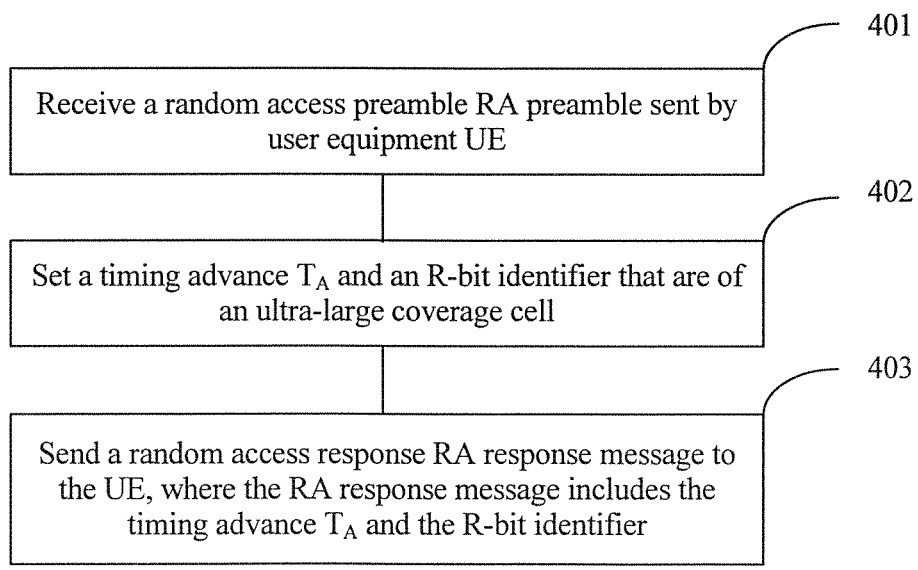
FIG. 4 is a schematic flowchart of an embodiment of a random access method according to the present invention.

FIG. 4 is a schematic flowchart of an embodiment of a random access method according to the present invention. The method may be executed by a base station, the method may be applied to a scenario of an ultra-large coverage cell, and the scenario of the ultra-large coverage cell may be a cell greater than 107 Km. As shown in FIG. 4, the method includes:

401. Receive a random access preamble RA preamble sent by user equipment UE.

402. Set a timing advance $T_A$ and an R-bit identifier that are of the ultra-large coverage cell, where the R-bit identifier is used to indicate a time granularity of the timing advance $T_A$ or is used to indicate a value range of the timing advance $T_A$.

403. Send a random access response RA response message to the UE, where the RA response message includes $T_A$ and the R-bit identifier.

The ultra-large coverage cell is a cell with a coverage distance greater than 107 Km.

The setting R-bit identifier may include:

when the R-bit identifier is set to 1 in the random access response message, indicating the value range of the timing advance $T_A$, where the value range is 0, 1, 2, ..., a value greater than 1282; or when the R-bit identifier is set to 0 in the random access response message, indicating the value range of the timing advance $T_A$, where the value range is 0, 1, 2, ..., 1282.

The setting R-bit identifier may include:

when the R-bit identifier is set to 1 in the random access response message, indicating that the time granularity of the timing advance $T_A$ is greater than 16 $T_S$; or when the R-bit identifier is set to 0 in the random access response message, indicating that the time granularity of the timing advance $T_A$ is 16 $T_S$.

By using the foregoing solution, for a scenario of an ultra-large coverage cell, a timing advance $T_A$ and an R-bit identifier that are of the ultra-large coverage cell are set, and the R-bit identifier is used to indicate a time granularity of the timing advance $T_A$ or is used to indicate a value range of the timing advance $T_A$, so that UE may adjust uplink transmission timing according to the timing advance $T_A$ and content indicated by the R-bit identifier, and send an uplink signal and data according to the adjusted uplink transmission timing. Therefore, uplink time and downlink time are synchronous when uplink signals sent by UEs in different positions in a cell arrive at a base station, thereby ensuring quality of communication between the UE and the base station.

Figure 5:
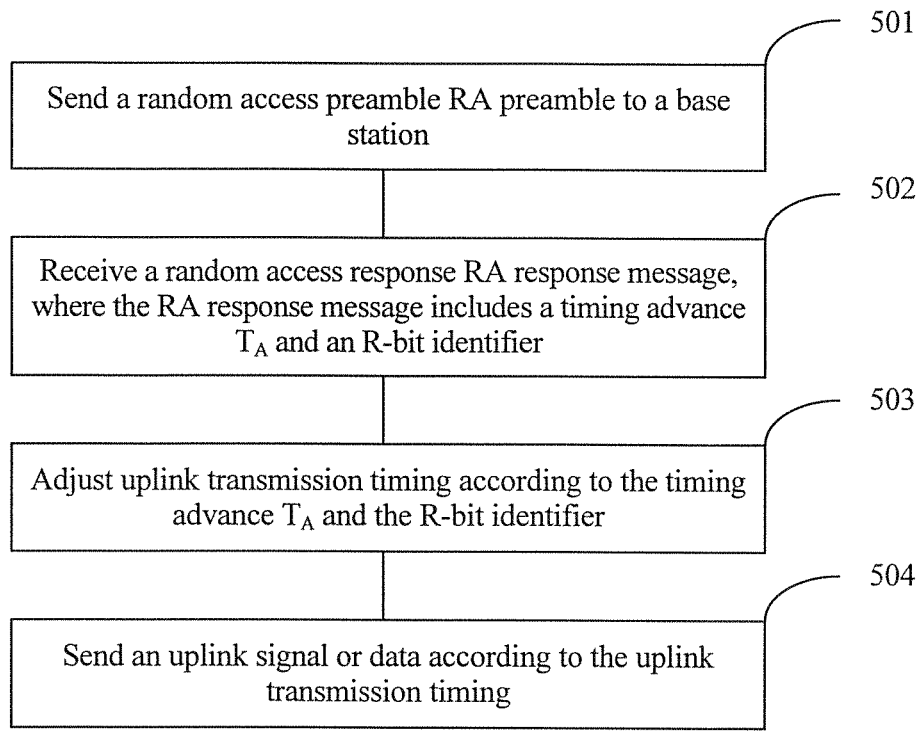
FIG. 5 is a schematic flowchart of another embodiment of a random access method according to the present invention.

FIG. 5 is a schematic flowchart of another embodiment of a random access method according to the present invention. The method may be executed by UE, the method may be applied to a scenario of an ultra-large coverage cell, and the scenario of the ultra-large coverage cell may be a cell greater than 107 Km. As shown in FIG. 5, the method includes:

501. Send a random access preamble RA preamble to a base station.

502. Receive a random access response RA response message, where the RA response message includes a timing advance $T_A$ and an R-bit identifier, and the R-bit identifier is used to indicate a time granularity of the timing advance $T_A$ or is used to indicate a value range of the timing advance $T_A$.

503. Adjust uplink transmission timing according to the timing advance $T_A$ and the time granularity of the timing advance $T_A$ or the value range of the timing advance $T_A$ indicated by the R-bit identifier.

504. Send an uplink signal or data according to the uplink transmission timing.

The ultra-large coverage cell is a cell with a coverage distance greater than 107 Km.

When the received R-bit identifier is 1, it is used to indicate the value range of the timing advance $T_A$, where the value range is 0, 1, 2, ..., a value greater than 1282; or when the received R-bit identifier is 0, it is used to indicate the value range of the timing advance $T_A$, where the value range is 0, 1, 2, ..., 1282.

When the received R-bit identifier is 1, it is used to indicate that the time granularity of the timing advance $T_A$ is greater than 16 $T_S$; or when the received R-bit identifier is 0, it is used to indicate that the time granularity of the timing advance $T_A$ is 16 $T_S$.

By using the foregoing solution, for a scenario of an ultra-large coverage cell, a timing advance $T_A$ and an R-bit identifier that are of the ultra-large coverage cell are received, uplink transmission timing is adjusted according to a value of the timing advance $T_A$ and a time granularity of the timing advance $T_A$ or a value range of the timing advance $T_A$ indicated by the R-bit identifier, and an uplink signal or data is sent according to the adjusted uplink transmission timing. Therefore, uplink time and downlink time are synchronous when uplink signals sent by UEs in different positions in a cell arrive at a base station, thereby ensuring quality of communication between the UE and the base station.

Figure 6:
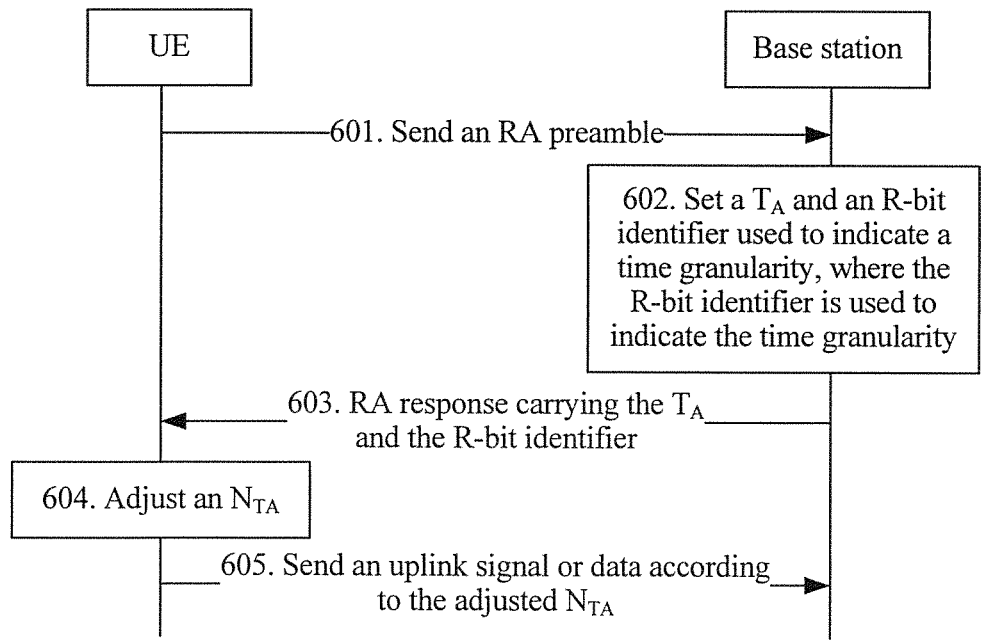
FIG. 6 is a schematic flowchart of another embodiment of a random access method according to the present invention.

FIG. 6 is a schematic flowchart of another embodiment of a random access method according to the present invention. The method may be applied to a scenario of an ultra-large coverage cell, and the scenario of the ultra-large coverage cell may be a cell greater than 107 Km. As shown in FIG. 6, the method includes:

601. UE sends a random access preamble RA preamble to a base station.

602. The base station sets a timing advance $T_A$ and an R-bit identifier that are of the ultra-large coverage cell, where the R-bit identifier is used to indicate a time granularity of the timing advance $T_A$.

It should be specially noted that, a distance of the ultra-large coverage cell that is set in this embodiment is intended only to understand an example in the solution of the present invention, which is included but not limited in the present invention.

Figure 7:
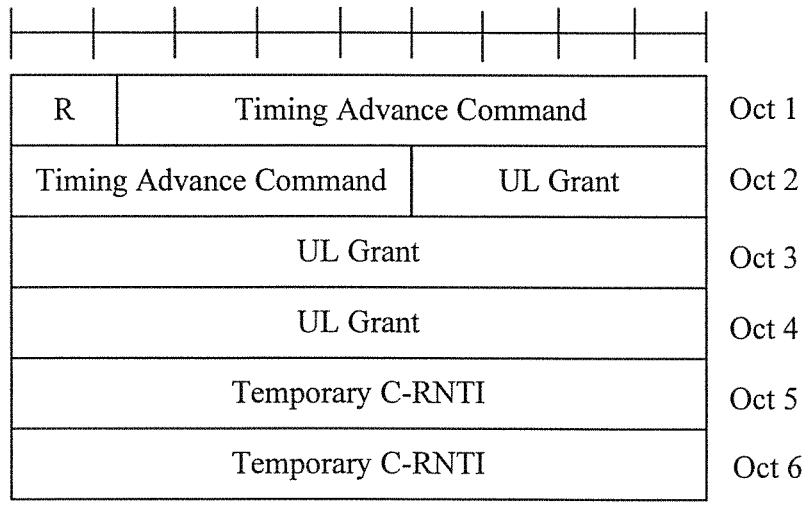
FIG. 7 is a schematic structural diagram of a MAC RAR message in another embodiment of a random access method according to the present invention.

FIG. 7 is a schematic structural diagram of a MAC RAR message. A timing advance command (Timing Advance command) is relative to current uplink timing. An R-bit identifier is set to instruct UE how to adjust uplink transmission timing $N_{TA}$, and the uplink transmission timing $N_{TA}$ is delivered to the UE by using a Medium Access Control (full name: Medium/Media Access Control, MAC for short) control unit, as shown in FIG. 7.

Optionally, when the R-bit identifier is set to 1, it indicates that a time granularity of a timing advance $T_A$ is greater than 16 $T_S$, for example, the time granularity may be set to 2×16 $T_S$, that is, 32 $T_S$. This is only an example provided in the present invention, and the present invention includes but is not limited to the foregoing example, provided that it is ensured that the time granularity of the R-bit identifier is greater than 16 $T_S$.

However, in the present invention, to adapt different cell coverage distances, another possible implementation manner provided in this embodiment of the present invention is: when the R-bit identifier is set to 1, it indicates that a time granularity of a timing advance $T_A$ is greater than 16 $T_S$ and the time granularity $T_S$ is 1/(2048×15000) second. For example, an ultra-large coverage cell of 200 Km is used as an example for description, a value range of the timing advance $T_A$ agreed on by a base station and UE is (0, 1, 2, ..., 1282), the time granularity in the R-bit identifier is 32, and the base station may set a timing advance $T_A$ by using a time granularity of 1.04 µs (that is, 32×$T_S$) as an interval.

Optionally, another possible implementation manner provided in this embodiment of the present invention is: the R-bit identifier is set to 0, indicating that a time granularity of a timing advance $T_A$ is 16 $T_S$.

It should be specially noted that in this embodiment, an ultra-large coverage cell indication that is of the R-bit identifier and that is set in the MAC RAR is only an example provided in the present invention. The R-bit identifier is used to set an ultra-large coverage cell, which is not limited to the foregoing description, in other words, provided that UE can be informed that a time granularity of a timing advance $T_A$ is greater than 16 $T_S$.

603. The base station sends a random access response RA response to the UE, where the RA response includes the timing advance $T_A$ and the R-bit identifier.

604. The UE obtains uplink transmission timing according to the timing advance $T_A$ sent by the base station and the time granularity of the timing advance $T_A$ or the value range of the timing advance $T_A$ indicated by the R-bit identifier.

Specifically, when the R-bit identifier is set to 1, indicating that the time granularity of the timing advance $T_A$ is greater than 16 $T_S$, and it is assumed that a value of N is 32, the value range of the $T_A$ is (0, 1, 2, ..., 1282), and a position of the UE in a cell is farthest from the base station, maximum uplink transmission timing $N_{TA}$ that can be adjusted by the UE may be 1282×32×$T_S$, that is, 1.34 ms, where $T_S$ is 1/(2048×15000) second. That is, the $N_{TA}$ may be set from a range of 0 to 1.34 ms, and when $N_{TA}$=1.34 ms, a corresponding cell coverage distance is 200 Km.

605. The UE sends an uplink signal or data according to the uplink transmission timing.

This embodiment of the present invention is applied to a scenario of an ultra-large coverage cell, and a base station sets a timing advance $T_A$ of the ultra-large coverage cell and an ultra-large coverage cell indication of an R-bit identifier. The ultra-large coverage cell indication is used to indicate a time granularity of the timing advance $T_A$, so that UE may adjust uplink transmission timing of the UE according to a value of the timing advance $T_A$ and the indication of the R-bit identifier. Therefore, uplink time and downlink time are aligned when uplink signals sent by UEs in different positions in a cell arrive at the base station, thereby ensuring quality of communication between the UE and the base station.

Figure 8:
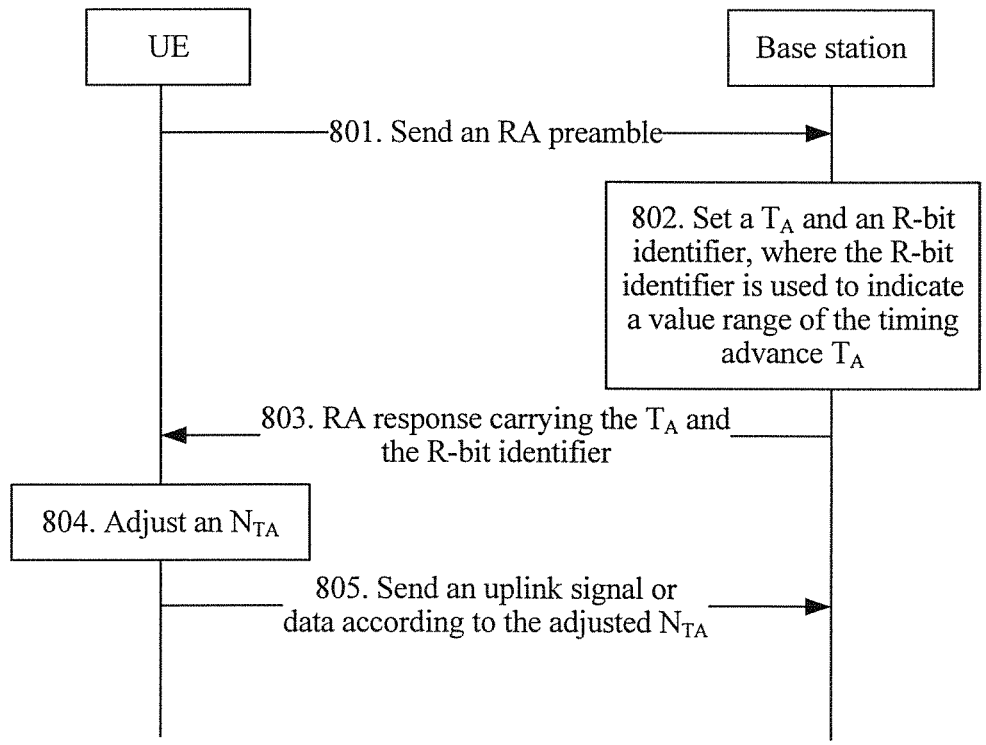
FIG. 8 is a schematic flowchart of another embodiment of a random access method according to the present invention.

FIG. 8 is a schematic flowchart of another embodiment of a random access method according to the present invention. The method may be applied to a scenario of an ultra-large coverage cell, and the scenario of the ultra-large coverage cell may be a cell greater than 107 Km. As shown in FIG. 8, the method includes:

801. UE sends a random access preamble RA preamble to a base station.

802. The base station sets a timing advance $T_A$ and an R-bit identifier that are of the ultra-large coverage cell, where the R-bit identifier is used to indicate a value range of the timing advance $T_A$.

The R-bit identifier may be included in MAC RAR, as shown in FIG. 7, including:

when the R-bit identifier is set to 1, indicating that a time granularity of a timing advance $T_A$ range (0, 1, 2, ..., a value greater than 1282) is 16 $T_S$.

Optionally, when the R-bit identifier is set to 1, it indicates that the value range of the timing advance $T_A$ may be (0, 1, 2, ..., 2564), for example, a maximum value of the value range may be set to a multiple of 1282, that is, 2564. Certainly, this is only an example provided in this embodiment of the present invention, and the present invention includes but is not limited to the foregoing example, provided that it is ensured that the value range of the timing advance $T_A$ is greater than 1282.

In the present invention, to adapt different cell coverage distances, and it is assumed that a position of UE in a cell is farthest from a base station, a value of the timing advance $T_A$ may be 2564, and the time granularity $T_S$ is 1/(2048×15000) second. For example, the base station may set uplink transmission timing within a range of 0 to a maximum value 1.34 ms (that is, 2564×16×$T_S$) of a corresponding 200 Km ultra-large coverage cell by using a time granularity of 0.52 µs (that is, 16×$T_S$) as an interval.

Further, the R-bit identifier may further be set to 0, indicating that a time granularity of a timing advance $T_A$ range (0, 1, 2, ..., 1282) is 16 $T_S$.

It should be specially noted that, a cell coverage distance that is set in this embodiment is intended only to understand an example in the solution of the present invention, which is included but not limited in the present invention.

803. The base station sends an RA response to the UE, where the RA response includes the timing advance $T_A$ and the R-bit identifier.

804. The UE adjusts the uplink transmission timing according to the received timing advance $T_A$ and the value range of the timing advance $T_A$ indicated by the R-bit identifier.

The UE adjusts the uplink transmission timing according to the received timing advance $T_A$ and the value range of the timing advance $T_A$ indicated by the R-bit identifier. For example, when the R-bit identifier is set to 1, the time granularity of the timing advance $T_A$ is 16 $T_S$, the timing advance $T_A$ range is (0, 2, 4, ..., 2564), and maximum uplink transmission timing $N_{TA}$ may be 2564×16×$T_S$, that is, 1.34 ms. Therefore, a maximum cell coverage distance that can be supported by the UE is 3×10$^8$×(2×1282×16×$T_S$)/2, which is approximately equal to 200 kilometers, where 3×10$^8$ is a speed of light.

When the R-bit identifier is set to 0, the timing advance $T_A$ range received by the UE is (0, 1, 2, ..., 1282), and the time granularity of the timing advance $T_A$ is 16 $T_S$. It should be specially noted that, when the R-bit identifier is set to 0, and if a value of the timing advance $T_A$ exceeds 1282, the UE considers that a fault occurs and the UE performs cell selection again.

805. The UE sends an uplink signal or data according to the uplink transmission timing.

This embodiment of the present invention is applied to a scenario of an ultra-large coverage cell, and a base station sets a timing advance $T_A$ of the ultra-large coverage cell and a value range of the timing advance $T_A$ in an R-bit identifier, so that UEs in different positions may send uplink signals to the base station according to the timing advance $T_A$ and the value range of the timing advance $T_A$ in the R-bit identifier. Therefore, uplink time and downlink time are synchronous when uplink signals sent by UEs in different positions in a cell arrive at the base station, thereby ensuring quality of communication between the UE and the base station.

Figure 1:
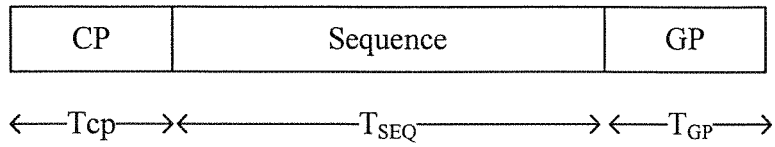
FIG. 1 is a schematic structural diagram of a random access sequence in the prior art.

The present invention provides another random access method, and the method is described in detail as follows:

When uplink synchronization is not established between UE and a base station, the UE needs to send a random access preamble RA preamble to the base station. As shown in FIG. 1, in addition to including a sequence (sequence), the preamble may further include:

a cyclic prefix (English: cyclic prefix; CP for short), used to perform frequency domain detection and eliminate intersymbol interference to a greatest extent; and a guard period (English: guard period; GP for short), used to ensure that there is a sufficient timing advance (English: Timing Advance; $T_A$ for short) when user equipment (English: User Equipment; UE for short) that is farthest from the base station sends a signal to the base station, that is, the preamble sent by the UE may be in a range that can be received by the base station, so that interference between the preamble sent by the UE and an uplink signal sent by another UE may be avoided.

When the UE sends the preamble, a distance between the base station and the UE is not learned, and therefore when the preamble is designed, a sufficient GP needs to be reserved to overcome an interference problem mentioned above. However, current design of the preamble can support only a maximum coverage distance of 107 Km, so that in a scenario of an ultra-large coverage distance (a cell coverage distance greater than 107 Km), a random access requirement for the ultra-large coverage distance cannot be met.

Because each UE has a different distance to the base station, generated transmission delays are different. When the uplink synchronization is not established between the UE and the base station and when the UE that is farthest from the base station sends the preamble to the base station, because of a long transmission delay, a time at which the preamble arrives at the base station lags behind a time at which the base station determines to receive the preamble, causing interference when another terminal sends an uplink signal to the base station. To resolve this problem, the GP is set after the preamble, so as to ensure that there is a sufficient timing advance $T_A$ when the UE that is farthest from the base station sends a preamble sequence, so that the preamble sequence sent by the UE may be in a range that can be received by the base station.

Further, a length of the GP determines a coverage cell distance that can be supported, that is:

$GP \times c/2$ = Coverage cell distance    (formula 1).

The GP is a guard period, c is $3 \times 10^8$ (a speed of light), and a correspondence table between a random access preamble format and a coverage cell distance may be calculated according to different GP values and by using formula (1), as shown in Table 1:

TABLE 1

| Random access preamble format | Cyclic prefix (CP) | Sequence length (sequence) | Guard period (GP) | Coverage cell distance |
|---|---|---|---|---|
| 0 | 103.125 μs | 800 μs | 96.875 μs | About 14 Km |
| 1 | 684.375 μs | 800 μs | 515.625 μs | About 77 Km |
| 2 | 206.25 μs | 1600 μs | 193.75 μs | About 29 Km |
| 3 | 684.375 μs | 1600 μs | 715.625 μs | About 107 Km |

When the random access preamble format is 0, the maximum coverage cell distance is 14 Km, which is suitable for a normal coverage cell. When the random access preamble format is 1, the maximum coverage cell distance is 77 Km, which is suitable for a large coverage cell. When the random access preamble format is 2, the maximum coverage cell distance is 29 Km, which is suitable for a relatively large coverage cell and a scenario in which UE moves relatively fast. When the random access preamble format is 3, the maximum coverage cell distance is 107 Km, which is suitable for ultra-long distance coverage such as a sea surface and a desert.

However, current communication may support a maximum coverage cell distance of 107 kilometers. With development of rapid transit, a requirement for random access is increasingly high, for example, people want to maintain good communication quality on a high speed train and an airplane, but existing random access cannot ensure communication quality of an ultra-large coverage cell greater than 107 Km.

To resolve the foregoing problem, the present invention provides the following technical solution.

Figure 9:
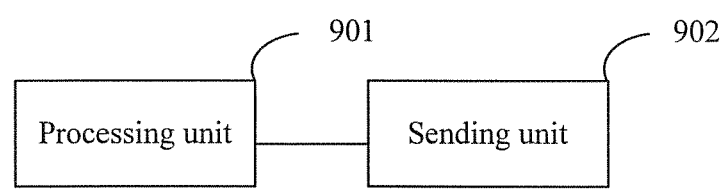
FIG. 9 is a schematic structural diagram of another embodiment of a random access apparatus according to the present invention.

FIG. 9 is a schematic structural diagram of another embodiment of a random access apparatus according to the present invention. The apparatus may be configured to execute methods in embodiments shown in FIG. 11 and FIG. 13, and the apparatus may be a base station. As shown in FIG. 9, the apparatus includes a processing unit 901 and a sending unit 902.

The processing unit 901 is configured to obtain a random access offset range for sending a random access preamble RA preamble.

The processing unit 901 is configured to determine, according to radio environment measurement information REM, that a position of a UE in a current cell exceeds a coverage distance supported by a guard period GP of the preamble and is less than a coverage distance corresponding to $c \times (GP + \text{Random access offset range})/2$, where c is a speed of light and GP is a guard period in a random access preamble format 3.

It should be specially noted that, the radio environment measurement (Radio Environment Measurement, REM) information includes at least one type of the following information: signal strength, historical information, an environment map, or the like.

The sending unit 902 is configured to send the preamble.

Specifically, the random access offset range obtained by the processing unit may include offsetting by N subframes or M offset symbols, where M is a positive integer greater than or equal to 1 and N is a positive integer greater than or equal to 1.

Specifically, the processing unit is specifically configured to receive a broadcasted system message, where the broadcasted system message carries the random access offset range for sending the random access preamble RA preamble.

Specifically, the processing unit is specifically configured to obtain the random access offset range according to a cell coverage distance and by using the following formula:

Cell Coverage Distance = $c \times (GP + \text{Random Access Offset range})/2$.

The cell coverage distance is a cell that is preset to be greater than 107 Km, c is $3 \times 10^8$, and GP is the guard period in the random access preamble format 3.

For a scenario of an ultra-large coverage cell in this embodiment of the present invention, it is determined, according to radio environment measurement information REM, that a position of the UE in a current cell exceeds a coverage distance supported by a guard period GP of the preamble and is less than a coverage distance corresponding to $c \times (GP + \text{Random access offset range})/2$, so that the UE controls a sending time for sending the preamble within a range that can be received by a base station, thereby ensuring a success rate of random access in the scenario of the ultra-large coverage cell, and further improving system stability.

It should be specially noted that, in the embodiment shown in FIG. 9, a hardware device corresponding to the processing unit may be a processor, and a hardware device corresponding to the sending unit may be a transmitter.

Figure 10:
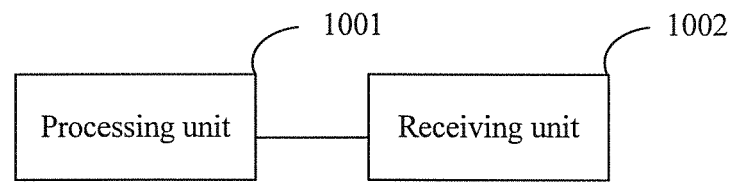
FIG. 10 is a schematic structural diagram of another embodiment of a random access apparatus according to the present invention.

FIG. 10 is a schematic structural diagram of another embodiment of a random access apparatus according to the present invention. The apparatus may be configured to execute methods in embodiments shown in FIG. 12 and FIG. 14, and the apparatus may be a base station. As shown in FIG. 10, the apparatus includes:

a processing unit 1001, configured to obtain, according to a current cell coverage distance, a random access offset range for receiving a random access preamble RA preamble; and a receiving unit 1002, configured to receive the preamble within a first time range, where the first time range includes a sum of a message length of the preamble and the random access offset range obtained by the processing unit.

Specifically, the random access offset range that may be obtained by the processing unit according to the current cell coverage distance includes offsetting by N subframes or M offset symbols, where M is a positive integer greater than or equal to 1 and N is a positive integer greater than or equal to 1.

Specifically, the receiving unit is specifically configured to obtain, according to the current cell coverage distance and by using the following formula, the random access offset range for receiving the random access preamble RA preamble, and the formula is:

Cell coverage distance=$c \times (GP + \text{Random access offset range})/2$.

The cell coverage distance is a cell that is preset to be greater than 107 Km, c is $3 \times 10^8$, and GP is a guard period in a random access preamble format 3.

For a scenario of an ultra-large coverage cell in this embodiment of the present invention, a base station calculates, according to a cell coverage distance, an offset range for sending a preamble, and receives the preamble within a first time range, where the first time range includes a sum of a message length of the preamble and the random access offset range obtained by the processing unit, so that UE controls a sending time for sending the preamble within a range that can be received by the base station, thereby ensuring a success rate of random access in the scenario of the ultra-large coverage cell, and further improving system stability.

It should be specially noted that, in the embodiment shown in FIG. 10, a hardware device corresponding to the receiving unit may be a receiver, and a hardware device corresponding to the processing unit may be a processor.

Figure 10A:
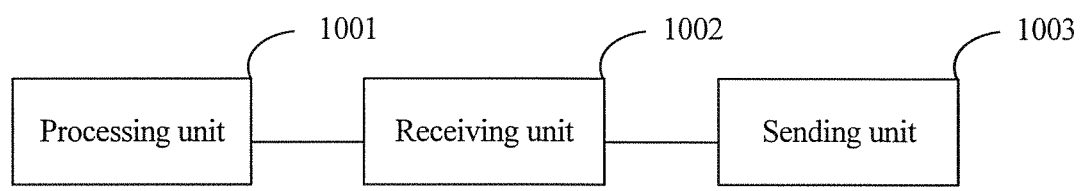
FIG. 10a is a schematic structural diagram of another embodiment of a random access apparatus according to the present invention.

It should be specially noted that, as shown in FIG. 10a, on the basis of the apparatus shown in FIG. 10, the apparatus further includes:

a sending unit 1003, configured to add the random access offset range to a broadcasted system message.

For a scenario of an ultra-large coverage cell in this embodiment of the present invention, a base station calculates, according to a cell coverage distance, an offset range for sending a preamble, and broadcasts the offset range, so that UE determines that a sending time for sending the preamble is within a range that can be received by the base station, thereby ensuring a success rate of random access in the scenario of the ultra-large coverage cell, and further improving system stability.

It should be specially noted that, in the embodiment shown in FIG. 10a, a hardware device corresponding to the receiving unit may be a receiver, a hardware device corresponding to the processing unit may be a processor, and a hardware device corresponding to the sending unit may be a transmitter.

Figure 11:
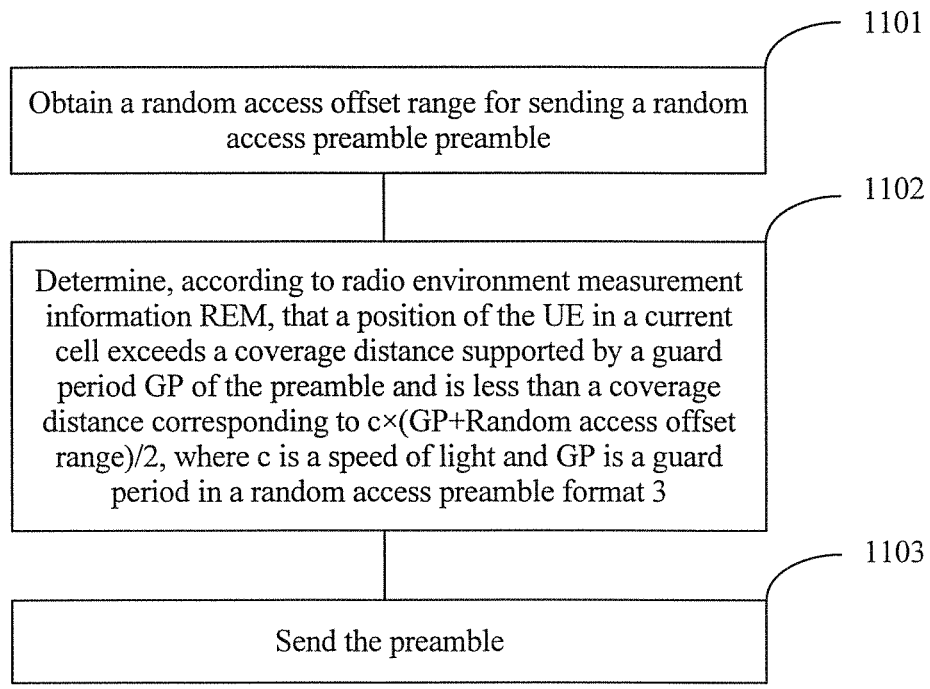
FIG. 11 is a schematic flowchart of another embodiment of a random access method according to the present invention.

FIG. 11 is a schematic flowchart of another embodiment of a random access method according to the present invention. The method may be applied to a scenario of an ultra-large coverage cell. As shown in FIG. 11, the method includes:

1101. User equipment UE obtains a random access offset range for sending a random access preamble RA preamble.

1102. The UE determines, according to radio environment measurement information REM, that a position of the UE in a current cell exceeds a coverage distance supported by a guard period GP of the preamble and is less than a coverage distance corresponding to $c \times (GP + \text{Random access offset range})/2$, where c is a speed of light and GP is a guard period in a random access preamble format 3.

It should be specially noted that, the radio environment measurement (Radio Environment Measurement, REM) information includes at least one type of the following information: signal strength, historical information, an environment map, or the like.

1103. The UE sends the preamble.

Specifically, the random access offset range includes offsetting by N subframes or M offset symbols, where M is a positive integer greater than or equal to 1 and N is a positive integer greater than or equal to 1.

Specifically, the obtaining a random access offset range for sending a random access preamble RA preamble includes: receiving a broadcasted system message, where the broadcasted system message carries the random access offset range for sending the random access preamble RA preamble.

Specifically, the obtaining a random access offset range for sending a random access preamble RA preamble includes:

obtaining the random access offset range according to a cell coverage distance and by using the following formula:

Cell coverage distance=$c \times (GP + \text{Random access offset range})/2$.

The cell coverage distance is a cell that is preset to be greater than 107 Km, c is $3 \times 10^8$, and GP is the guard period in the random access preamble format 3.

For a scenario of an ultra-large coverage cell in this embodiment of the present invention, it is determined, according to radio environment measurement information REM, that a position of UE in a current cell exceeds a coverage distance supported by a guard period GP of the preamble and is less than a coverage distance corresponding to $c \times (GP + \text{Random access offset range})/2$, so that the UE controls a sending time for sending the preamble within a range that can be received by a base station, thereby ensuring a success rate of random access in the scenario of the ultra-large coverage cell, and further improving system stability.

Figure 12:
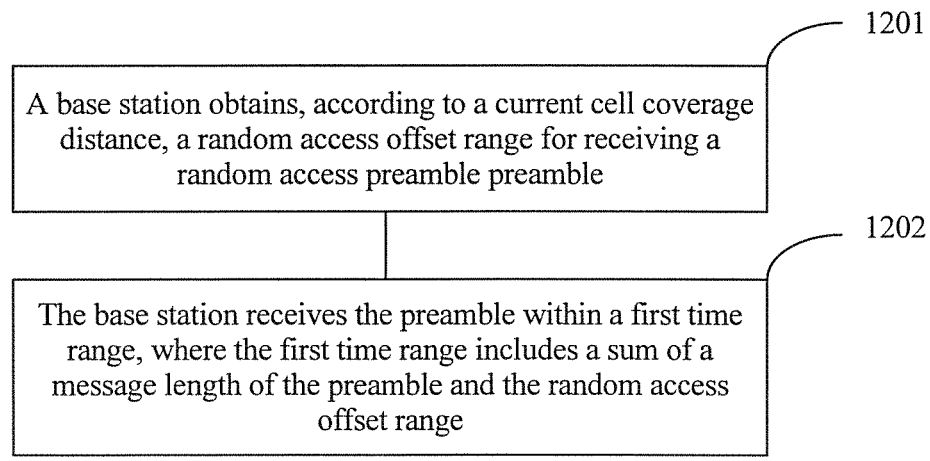
FIG. 12 is a schematic flowchart of another embodiment of a random access method according to the present invention.

FIG. 12 is a schematic flowchart of another embodiment of a random access method according to the present invention. The method may be applied to a scenario of an ultra-large coverage cell. As shown in FIG. 12, the method includes:

1201. A base station obtains, according to a current cell coverage distance, a random access offset range for receiving a random access preamble RA preamble.

1202. The base station receives the preamble within a first time range, where the first time range includes a sum of a message length of the preamble and the random access offset range.

Specifically, the random access offset range includes offsetting by N subframes or M offset symbols, where M is a positive integer greater than or equal to 1 and N is a positive integer greater than or equal to 1.

Specifically, the random access offset range for receiving the random access preamble RA preamble is obtained according to the current cell coverage distance and by using the following formula, including:

Cell coverage distance=$c×(GP$+Random access offset range$)/2$.

The cell coverage distance is a cell that is preset to be greater than 107 Km, c is $3×10^8$, and GP is a guard period in a random access preamble format 3.

Further, the method further includes:

adding, by the base station, the random access offset range to a broadcasted system message.

For a scenario of an ultra-large coverage cell in this embodiment of the present invention, a base station calculates, according to a cell coverage distance, an offset range for sending a preamble, and broadcasts the offset range, so that UE determines that a sending time for sending the preamble is within a range that can be received by the base station, thereby ensuring a success rate of random access in the scenario of the ultra-large coverage cell, and further improving system stability.

Figure 13:
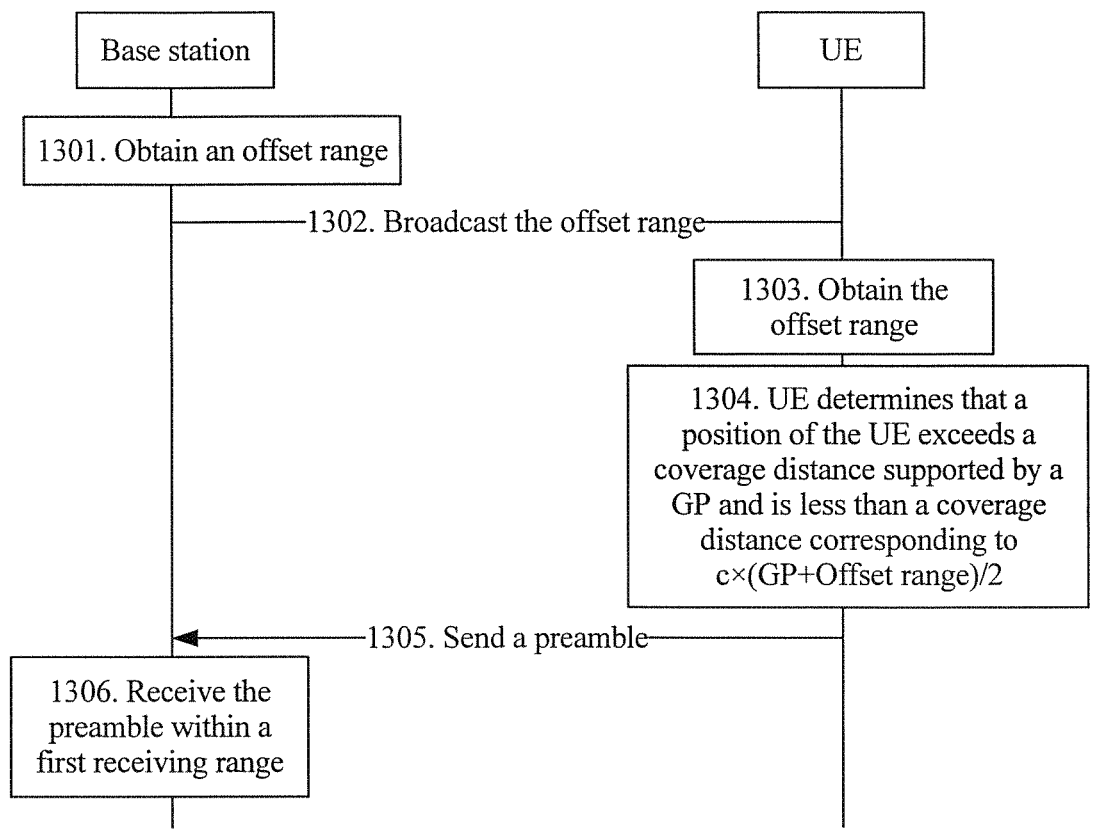
FIG. 13 is a schematic flowchart of another embodiment of a random access method according to the present invention.

FIG. 13 is a schematic flowchart of another embodiment of a random access method according to the present invention. The method may be applied to a scenario of an ultra-large coverage cell. A value of GP in this embodiment is described by using format 3 in Table 1 as an example, which is included but not limited in the present invention. A solution includes the following steps:

1301. A base station obtains, according to an ultra-large coverage cell distance, an offset range for receiving a preamble.

The offset range includes a quantity (N) of subframes that need to be offset or a quantity (M) of symbols that need to be offset when the preamble is sent in the scenario of the ultra-large coverage cell, where N and M are positive integers greater than or equal to 1.

Further, to help understand the offset range, this embodiment is described by using FDD LTE as an example, which is included but not limited in the present invention.

When the offset range is the quantity N of offset subframes, a timeslot structure with equal length in top and bottom is used in FDD LTE, that is, one radio frame is 10 ms and includes 10 subframes and 20 timeslots in total. It is assumed that the current cell is preset to be an ultra-large coverage cell of 250 Km in step 1301, and it can be learned by using formula (1) that:

250 Km=$c×(GP+N×10^{-3})/2$.

A value of c is $3×10^8$, and a value of GP is $715.625×10^{-6}$, so that N=1 may be calculated.

FDD LTE defines two CP lengths to support different coverage scenarios. One length is a conventional CP in which each subframe includes 14 symbols (Symbol), a symbol length is 66.67 μs, a CP length of the first symbol is 5.208 μs, and a CP length of another symbol is 4.687 μs. The other length is an extended CP in which each subframe includes 12 symbols, a length of each symbol is 66.67 μs, each CP length is 16.67 μs, and a total length of the symbol and the CP is 83.34 μs.

When the offset range is the quantity of offset symbols, if the extended CP is used as an example, and it is assumed that the current cell is preset to be an ultra-large coverage cell of 300 Km in step 1301, and it can be learned by using formula (1) that:

300 Km=$c×(GP+M×83.34×10^{-6})/2$.

A value of c is $3×10^8$, and a value of GP is $715.625×10^{-6}$. $83.34×10^{-6}$ is a total length of the symbol and the CP, so that M≈16 may be calculated.

It should be specially noted that, the offset range in this embodiment may also refer to offsetting by N subframes and M symbols.

1302. The base station broadcasts the offset range.

Specifically, the base station broadcasts the offset range in a system message, for example, may broadcast the offset range in SIB 2.

Further, the system message may further carry an ultra-large coverage cell indication, which may be represented by a bit, an identifier, a symbol, or a character string. Alternatively, a value of an extension cell range indicator (extension cell range indicator) may be used to indicate whether to send an ultra-large coverage cell indication. For example, a value "0" indicates no sending and a value "1" indicates sending.

It should be specially noted that, these are only examples provided in this embodiment of the present invention, which are included but not limited in the present invention.

1303. UE receives the offset range.

1304. The UE determines, according to radio environment measurement information, that a position of the UE in a current cell exceeds a coverage distance supported by a guard period GP of the preamble and is less than a coverage distance corresponding to $c×(GP+Offset range)/2$, where c is a speed of light and GP is a guard period in a random access preamble format 3.

The radio environment measurement (Radio Environment Measurement, REM) information includes at least one type of the following information: signal strength, historical information, an environment map, or the like.

Specifically, when the UE determines that the position of the UE in the current cell exceeds the coverage distance supported by the guard period GP of the preamble, the cell is an ultra-large coverage cell. As shown in FIG. 7, according to step 603, the offset range received by the UE is 16 symbols, that is, the offset range is $16×83.34×10^{-6}$ second. The UE determines that the position of the UE in the current cell is less than the coverage distance corresponding to $c×(GP+16×83.34×10^{-6})/2$, which can ensure that a sending time for sending the preamble is within a time range that can be received by a base station.

It should be specially noted that, if there is no uplink synchronization when the UE sends the preamble, a sending time point is determined according to a downlink subframe.

1305. The UE sends a preamble sequence to the base station.

1306. The base station receives the preamble within a first receiving range, where the first receiving range includes a sum of a message length of the preamble and the offset range.

For a scenario of an ultra-large coverage cell in this embodiment of the present invention, it is determined, according to radio environment measurement information REM, that a position of the UE in a current cell exceeds a coverage distance supported by a guard period GP of the preamble and is less than a coverage distance corresponding to c×(GP+Random access offset range)/2, so that the UE controls a sending time for sending the preamble within a range that can be received by a base station, thereby ensuring a success rate of random access in the scenario of the ultra-large coverage cell, and further improving system stability.

Figure 14:
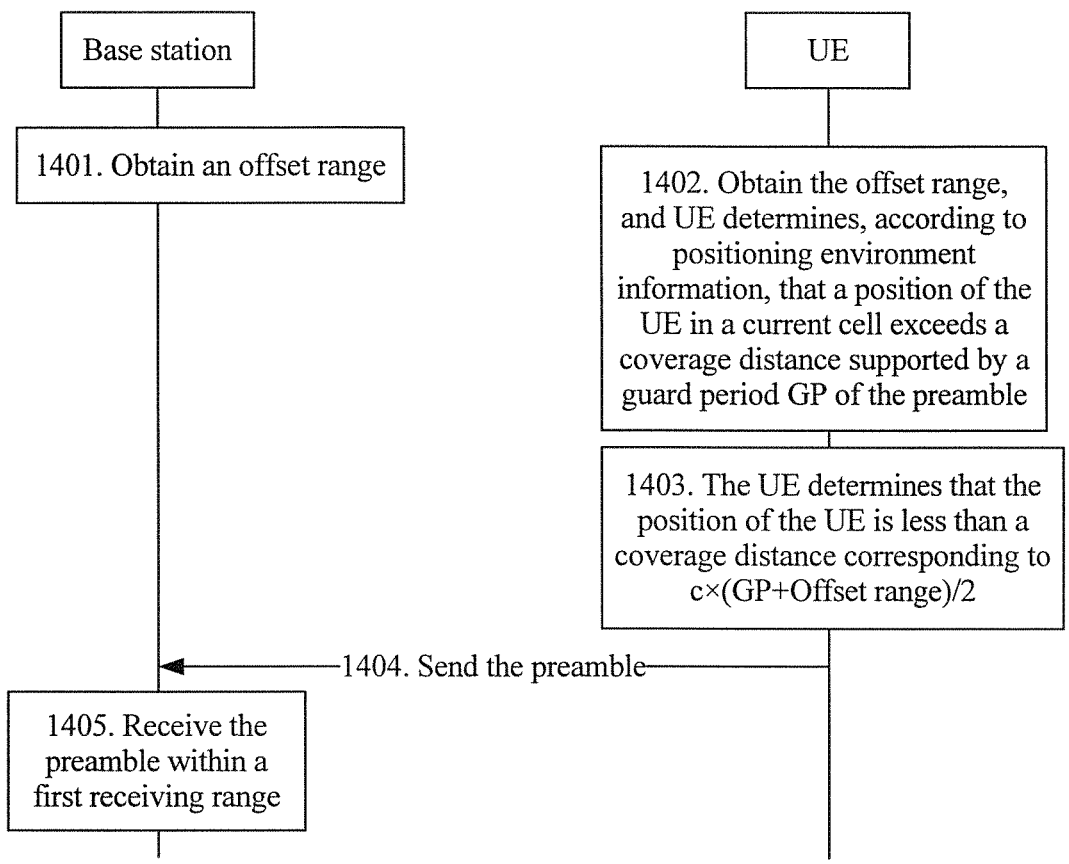
FIG. 14 is a schematic flowchart of another embodiment of a random access method according to the present invention.

FIG. 14 is a schematic flowchart of another embodiment of a random access method according to the present invention. This embodiment may be applied to a scenario of an ultra-large coverage cell. A value of GP in this embodiment may be described by using format 3 in Table 1 as an example, which is included but not limited in the present invention. A solution includes the following steps:

1401. In a scenario of a preset ultra-large coverage cell, a base station obtains, according to the currently preset coverage cell, a random access offset range for receiving a preamble.

The random access offset range includes a quantity of offset subframes or a quantity of offset symbols.

When the random access offset range is the quantity of subframes and the preset ultra-large coverage cell is 250 Km, a quantity of offset subframes of the preamble for the current ultra-large coverage cell may be obtained by using formula (1), which is specifically:

$$250\ Km = c \times (GP + N \times 10^{-3})/2.$$

A value of c is $3 \times 10^8$, and a value of GP is $715.625 \times 10^{-6}$, so that N=1 may be calculated. That is, after the UE sends the preamble, the base station may add a subframe range to a subframe range of format 3 to perform receiving.

When the offset range is the quantity of offset symbols and the preset ultra-large coverage cell is 250 Km, and if an extended CP is used as an example, it can be learned by using formula (1) that:

$$250\ Km = c \times (GP + M \times 83.34 \times 10^{-6})/2.$$

A value of c is $3 \times 10^8$, and a value of GP is $715.625 \times 10^{-6}$. $83.34 \times 10^{-6}$ is a total length of the symbol and the CP, so that M≈11 may be calculated. That is, after the UE sends the preamble, the base station may add 11 symbols to the subframe range of format 3 to perform receiving.

It should be specially noted that, the offset range in this embodiment may also refer to offsetting by N subframes and M symbols.

1402. User equipment UE obtains a random access offset range for sending a random access preamble RA preamble, and the UE determines, according to positioning environment information, that a position of the UE in the current cell exceeds a coverage distance supported by a guard period GP of the preamble.

It should be specially noted that, a method in which the UE calculates the offset range of the preamble is similar to the method for calculating the offset range of the preamble in step 401, and details are not described herein.

It should be specially noted that, step 1001 and step 1002 are not performed in a sequence, and may also be concurrently performed.

1403. The UE determines that the position of the UE in the current cell is less than a coverage distance corresponding to c×(GP+Offset range)/2, where c is a speed of light and GP is a guard period in a random access preamble format 3.

It should be specially noted that, UEs have different distances to the base station, so that generated transmission delays are different. That is, the UE that is farthest from the base station has a longest transmission delay when sending the preamble to the base station. To ensure communication quality, a time at which the UE sends the preamble needs to be within a time range that can be received by the base station.

It should be specially noted that, the offset range in this embodiment may also refer to offsetting by N subframes and M symbols.

1404. The UE sends a preamble sequence to the base station.

1405. The base station receives the preamble sequence within a first receiving range, where the first receiving range includes a sum of a message length of the preamble and the random access offset range.

For a scenario of an ultra-large coverage cell in this embodiment of the present invention, a base station calculates, according to a cell coverage distance, an offset range for sending a preamble, and receives the preamble within a first time range, where the first time range includes a sum of a message length of the preamble and the random access offset range obtained by the processing unit, so that UE controls a sending time for sending the preamble within a range that can be received by the base station, thereby ensuring a success rate of random access in the scenario of the ultra-large coverage cell, and further improving system stability.

A person of ordinary skill in the art may be aware that, in combination with the examples described in the embodiments disclosed in this specification, method steps and units may be implemented by electronic hardware, computer software, or a combination thereof. To clearly describe the interchangeability between the hardware and the software, the foregoing has generally described steps and compositions of each embodiment according to functions. Whether the functions are performed by hardware or software depends on particular applications and design constraint conditions of the technical solutions. A person of ordinary skill in the art may use different methods to implement the described functions for each particular application, but it should not be considered that the implementation goes beyond the scope of the present invention. When the present invention is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation: The computer-readable medium may include a RAM, a ROM, an EEPROM, a CD-ROM, or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source by using a coaxial cable, an optical fiber/cable, a twisted pair, a digital subscriber line (DSL) or wireless technologies such as infrared ray, radio and microwave, the coaxial cable, optical fiber/cable, twisted pair, DSL or wireless technologies such as infrared ray, radio and microwave are included in fixation of a medium to which they belong. For example, a disk (Disk) and disc (disc) used by the present invention includes a compact disc CD, a laser disc, an optical disc, a digital versatile disc (DVD), a floppy disk and a Blu-ray disc, where the disk generally copies data by a magnetic means, and the disc copies data optically by a laser means. The foregoing combination should also be included in the protection scope of the computer-readable medium.

The present invention is described in detail with reference to the accompany drawings and in combination with the exemplary embodiments, but the present invention is not limited thereto. Various equivalent modifications or replacements can be made to the embodiments of the present invention by a person of ordinary skill in the art without departing from the spirit and essence of the present invention, and the modifications or replacements shall fall within the scope of the present invention.

What is claimed is:

1. A random access apparatus for use in an ultra-large coverage cell, the apparatus comprising:
    a receiver, configured to receive a random access (RA) preamble sent by user equipment (UE), wherein the UE is within a coverage distance of the ultra-large coverage cell;
    a processor, configured to set a timing advance $T_A$ and a single range bit (R-bit) identifier that are of the ultra-large coverage cell after the receiver receives the RA preamble, wherein the R-bit identifier is used to indicate either a first or a second value range of the timing advance $T_A$ for a coverage distance of the ultra-large coverage cell;
    a transmitter, configured to send an RA response message to the UE, wherein the RA response message comprises the timing advance $T_A$ and the R-bit identifier that are set by the processor; and
    wherein the ultra-large coverage cell is a cell with a coverage distance greater than 107 Km, wherein the R-bit identifier is used to indicate a time granularity of the timing advance $T_A$, and wherein the processor is configured to:
    set the R-bit identifier to 1 in the random access response message, indicating that the time granularity of the timing advance $T_A$ is greater than 16 $T_S$, wherein $T_S$ represents a basic timing unit; or
    set the R-bit identifier to 0 in the random access response message, indicating that the time granularity of the timing advance $T_A$ is 16 $T_S$.

2. The random access apparatus according to claim 1, wherein the UE determines, based on positioning environment information, that a position of the UE in a current cell exceeds a coverage distance supported by a guard period (GP) of the RA preamble.

3. A random access apparatus for use in an ultra-large coverage cell, the apparatus comprising:
    a receiver, configured to receive a random access (RA) preamble sent by user equipment (UE), wherein the UE is within a coverage distance of the ultra-large coverage cell;
    a processor, configured to set a timing advance $T_A$ and a single range bit (R-bit) identifier that are of the ultra-large coverage cell after the receiver receives the RA preamble, wherein the R-bit identifier is used to indicate either a first or a second value range of the timing advance $T_A$ for a coverage distance of the ultra-large coverage cell;
    a transmitter, configured to send an RA response message to the UE, wherein the RA response message comprises the timing advance $T_A$ and the R-bit identifier that are set by the processor; and
    wherein the ultra-large coverage cell is a cell with a coverage distance greater than 107 Km, wherein the processor is configured to:
    set the R-bit identifier to 1 in the random access response message, indicating the value range of the timing advance $T_A$, wherein the value range is 0, 1, 2, . . . , a value greater than 1282; or
    set the R-bit identifier to 0 in the random access response message, indicating the value range of the timing advance $T_A$, wherein the value range is 0, 1, 2, . . . , 1282.

4. A random access apparatus for use in an ultra-large coverage cell, the apparatus comprising:
    a transmitter, configured to send a random access (RA) preamble to a base station, wherein the apparatus is within a coverage area of the ultra-large coverage cell;
    a receiver, configured to receive an RA response message sent by the base station, wherein the RA response message comprises a timing advance $T_A$ and a single range bit (R-bit) identifier, and the R-bit identifier is used to indicate either a first or a second value range of the timing advance $T_A$ for a coverage distance of the ultra-large coverage cell;
    a processor, configured to adjust uplink transmission timing according to the timing advance $T_A$ received by the receiver and the time granularity of the timing advance $T_A$ or the value range of the timing advance $T_A$ indicated by the R-bit identifier;
    wherein the transmitter is configured to send an uplink signal or data according to the uplink transmission timing adjusted by the processor; and
    wherein the ultra-large coverage cell is a cell with a coverage distance greater than 107 Km, wherein the R-bit identifier is used to indicate a time granularity of the timing advance $T_A$ and wherein the receiver is configured to:
    when the received R-bit identifier is 1, indicate that the time granularity of the timing advance $T_A$ is greater than 16 $T_S$, wherein $T_S$ represents a basic timing unit; or
    when the received R-bit identifier is 0, indicate that the time granularity of the timing advance $T_A$ is 16 $T_S$.

5. A random access apparatus for use in an ultra-large coverage cell, the apparatus comprising:
    a transmitter, configured to send a random access (RA) preamble to a base station, wherein the apparatus is within a coverage area of the ultra-large coverage cell;
    a receiver, configured to receive an RA response message sent by the base station, wherein the RA response message comprises a timing advance $T_A$ and a single range bit (R-bit) identifier, and the R-bit identifier is used to indicate either a first or a second value range of the timing advance $T_A$ for a coverage distance of the ultra-large coverage cell;
    a processor, configured to adjust uplink transmission timing according to the timing advance $T_A$ received by the receiver and the time granularity of the timing advance $T_A$ or the value range of the timing advance $T_A$ indicated by the R-bit identifier;
    wherein the transmitter is configured to send an uplink signal or data according to the uplink transmission timing adjusted by the processor; and
    wherein the ultra-large coverage cell is a cell with a coverage distance greater than 107 Km, wherein the receiver is configured to indicate the value range of the timing advance $T_A$ when the received R-bit identifier is 1, wherein the value range is 0, 1, 2, ..., a value greater than 1282; or when the R-bit identifier received by the receiver is 0, the value range of the timing advance $T_A$ is indicated, wherein the value range is 0, 1, 2, ..., 1282.

6. A random access method for use in an ultra-large coverage cell, the method comprising:

receiving a random access (RA) preamble sent by user equipment (UE), wherein the UE is within a coverage distance of the ultra-large coverage cell;

setting a timing advance $T_A$ and a single range bit (R-bit) identifier that are of the ultra-large coverage cell, wherein the R-bit identifier is used to indicate either a first or a second value range of the timing advance $T_A$ for a coverage distance of the ultra-large coverage cell;

sending an RA response message to the UE, wherein the RA response message comprises the timing advance $T_A$ and the R-bit identifier; and wherein the ultra-large coverage cell is a cell with a coverage distance greater than 107 Km, wherein the R-bit identifier is used to indicate a time granularity of the timing advance $T_A$ and wherein setting an R-bit identifier of the ultra-large coverage cell comprises:

setting the R-bit identifier to 1 in the random access response message, indicating that the time granularity of the timing advance $T_A$ is greater than 16 $T_S$, wherein $T_S$ represents a basic timing unit; or setting the R-bit identifier to 0 in the random access response message, indicating that the time granularity of the timing advance $T_A$ is 16 $T_S$.

7. A random access method for use in an ultra-large coverage cell, the method comprising:

receiving a random access (RA) preamble sent by user equipment (UE), wherein the UE is within a coverage distance of the ultra-large coverage cell;

setting a timing advance $T_A$ and a single range bit (R-bit) identifier that are of the ultra-large coverage cell, wherein the R-bit identifier is used to indicate either a first or a second value range of the timing advance $T_A$ for a coverage distance of the ultra-large coverage cell;

sending an RA response message to the UE, wherein the RA response message comprises the timing advance $T_A$ and the R-bit identifier; and wherein the ultra-large coverage cell is a cell with a coverage distance greater than 107 Km, wherein setting an R-bit identifier of the ultra-large coverage cell comprises:

when the R-bit identifier is set to 1 in the random access response message, indicating the value range of the timing advance $T_A$, wherein the value range is 0, 1, 2, ..., a value greater than 1282; or when the R-bit identifier is set to 0 in the random access response message, indicating the value range of the timing advance $T_A$, wherein the value range is 0, 1, 2, ..., 1282.

8. A random access method for use in an ultra-large coverage cell, the method comprising:

sending a random access (RA) preamble to a base station;

receiving an RA response message, wherein the RA response message comprises a timing advance $T_A$ and a single range bit (R-bit) identifier, and the R-bit identifier is used to indicate either a first or a second value range of the timing advance $T_A$ for a coverage distance of the ultra-large coverage cell;

adjusting uplink transmission timing according to the timing advance $T_A$ and the time granularity of the timing advance $T_A$ or the value range of the timing advance $T_A$ indicated by the R-bit identifier;

sending an uplink signal or data according to the adjusted uplink transmission timing; and wherein the ultra-large coverage cell is a cell with a coverage distance greater than 107 Km, wherein the R-bit identifier is used to indicate a time granularity of the timing advance $T_A$ and wherein:

the received R-bit identifier is 1, indicating that the time granularity of the timing advance $T_A$ is greater than 16 $T_S$, wherein $T_S$ represents a basic timing unit; or the received R-bit identifier is 0, indicating that the time granularity of the timing advance $T_A$ is 16 $T_S$.

9. A random access method for use in an ultra-large coverage cell, the method comprising:

sending a random access (RA) preamble to a base station;

receiving an RA response message, wherein the RA response message comprises a timing advance $T_A$ and a single range bit (R-bit) identifier, and the R-bit identifier is used to indicate either a first or a second value range of the timing advance $T_A$ for a coverage distance of the ultra-large coverage cell;

adjusting uplink transmission timing according to the timing advance $T_A$ and the time granularity of the timing advance $T_A$ or the value range of the timing advance $T_A$ indicated by the R-bit identifier;

sending an uplink signal or data according to the adjusted uplink transmission timing; and wherein the ultra-large coverage cell is a cell with a coverage distance greater than 107 Km, wherein:

when the received R-bit identifier is 1, the value range of the timing advance $T_A$ is indicated, wherein the value range is 0, 1, 2, ..., a value greater than 1282; or when the received R-bit identifier is 0, the value range of the timing advance $T_A$ is indicated, wherein the value range is 0, 1, 2, ..., 1282.

* * * * *